2,980,720
Patented Apr. 18, 1961

2,980,720

PURIFICATION PROCESS FOR OBTAINING DIBASIC ACIDS FREE OF METAL IMPURITIES

George P. Brown, Jr., West Deer Township, Allegheny County, and Norman W. Franke, Penn Township, Allegheny County, Pa., assignors to Gulf Research & Development Company, Pittsburgh, Pa., a corporation of Delaware No Drawing. Filed Sept. 4, 1957, Ser. No. 681,888

4 Claims. (Cl. 260—452)

This invention relates to an improved process for removing inorganic materials from organic acids and particularly to a process for removing inorganic materials from dibasic acids.

Dibasic acids can be prepared by oxidizing hydrocarbons, aliphatic, naphthenic or aromatic, or air-oxidized derivatives thereof, with nitric acid. Unfortunately in producing such acids the nitric acid used reacts with the metal equipment employed in the reaction to produce nitrates of such metals as iron, chromium, nickel, aluminum and possibly molybdenum. By metathesis some of the metal nitrate radicals are displaced by the dibasic acids to produce metal salts of the dibasic acids. These metal salts are colored, generally pink, green or brown, and are therefore undesirable, particularly when such acids are employed in preparing dibasic acid esters for use as plasticizers, which are preferably desired in the uncolored state. In addition, some of these metal salts are catalytic in nature and assist in producing undesirable oxidations of the dibasic acid esters.

We have found that dibasic acids containing metal salts as impurities can be purified of such impurities by the expedient of extracting such mixtures with acetone.

The dibasic acids which are advantageously purified in accordance with the process of this invention are those which have been obtained as a result of the nitric acid oxidation of hydrocarbons in metal equipment selected from the group consisting of iron, chromium, nickel, aluminum, and molybdenum. In general such dibasic acids are prepared by oxidizing a hydrocarbon, aliphatic, naphthenic or aromatic, or air-oxidized derivatives thereof, with nitric acid having a concentration of about 10 to about 100 percent, preferably about 50 to about 95 percent, at a temperature of about 50° to about 150° C., preferably about 75° to about 130° C., and a pressure of about atmospheric to about 1500 pounds per square inch, perferably about 100 to about 1000 pounds per square inch, for about 5 minutes to about 60 hours, preferably about 15 minutes to about 2 hours. The product obtained can then be treated, for example, by distillation at a temperature of about 30° to about 75° C. and a pressure of about 5 to about 100 millimeters of mercury, to remove nitric acid therefrom and obtain a product predominating in dibasic acids having 3 to about 12 carbon atoms.

This process is particularly effective in purifying dibasic acids prepared in accordance with the process disclosed and claimed in U.S. Patent No. 2,771,482, dated November 20, 1956, to George P. Brown, Jr., Edgar I. Crowley, and Norman W. Franke and assigned to the assignee of this invention. Briefly, in the process of the patent a saturated aliphatic hydrocarbon is initially subjected to oxidation with air or other oxygen-containing gas, i.e., a gas containing free oxygen for a time sufficient to obtain a product having a saponification number above about 100, and preferably between about 150 and 450, and the product obtained is thereafter subjected to further oxidation at an elevated temperature with nitric acid having a concentration above about 50, and preferably above about 60 percent, for a time sufficient to obtain substantial amounts of dibasic acids having 3 to 12 carbon atoms, such as succinic, glutaric and adipic acids.

In carrying out the process of this invention, the dibasic acids described above carrying the metal impurities are mixed with acetone. The dibasic acids will dissolve therein, while the metal impurities will not. The acetone containing the dissolved dibasic acids is separated from the metal impurities by any convenient method, for example, by filtration, and the acetone recovered by any suitable process, for example, by heating the dibasic acid-acetone mixture at a temperature of about 40° to about 85° F. at atmospheric pressure, leaving behind the purified dibasic acids.

The conditions under which the process is carried out are not critical and can be varied over a wide range. Thus, temperatures of about 50° to about 400° F. can be employed. However, a temperature of about 90° to about 133° F., which temperature is near the boiling point of acetone at atmospheric pressure, is preferred, since the selectivity of acetone near its boiling point to dibasic acids is higher than that of acetone at a lower temperature. The pressure can be atmospheric, although pressures up to about 30 atmospheres can be employed in order to permit operation at a higher desirable temperature while still maintaining the acetone in liquid phase. The extraction time will vary, of course, with the dibasic acids present and the pressure and temperature used, but in general a period of at least about one and preferably about 5 to about 10 minutes is sufficient.

The amount of acetone employed relative to the dibasic acids being treated can also vary over a wide range, although low acetone to dibasic acid ratios are preferred. In general, the amount of acetone employed relative to the dibasic acid, on a weight basis, should be less than about 15 to one and preferably about 5 to one. The extraction can be effected in one stage or a multiple number of stages if desired.

The purification process described above removes from the dibasic acids the inorganic coloring material of the type defined. In the event organic coloring material, such as nitrogen-containing acids and unsaturated acids is present, the same can be removed therefrom by contacting the acetone solution of the dibasic acids with an adsorptive material such as adsorptive carbon.

The process can be further illustrated by reference to the following example.

*Example 1*

861.5 grams of an oxidized wax mixture consisting of 322.5 grams of oil phase acids recovered from a previous nitric acid stage oxidation of air-oxidized deoiled foots oil and 539.3 grams of a 234 saponification number air-oxidized deoiled foots oil obtained by blowing 576 grams of deoiled foots oil for eleven hours at 160° C. with 2.5 liters of air per minute per kilogram of wax were continuously passed to a continuous autoclave together with 2530 grams of 65.6 percent aqueous nitric acid and 2140 liters of air. The pressure was maintained at about 500 pounds per square inch gauge, the temperature at 130° C. and the residence time was 30 minutes. The product obtained comprised a two-phase liquid product consisting of 2782 grams of nitric acid phase and 433 grams of oil phase. The oil phase was washed three times, each time with 200 grams of distilled water at about 90° C. The washings settled and were decanted, after cooling, after each wash, giving three oil phase washings. The washed oil phase was then heated for several hours in an open beaker over a water bath to evaporate dissolved water yielding 342 grams of oil phase acids.

The nitric acid phase was placed in a distillation flask and nitric acid distilled off at a pot temperature of 35° to 45° C., the temperature being regulated by the degree of vacuum maintained on the system, the pressure being adjusted to about 30 mm. Hg. Near the end of the distillation as the pot temperature began to increase, the pressure was gradually lowered to about 5 mm. Hg and the temperature was permitted to increase to 50° C. at which point the distillation was stopped. The first oil phase wash was added to the residue in the still pot and distillation was resumed under conditions similar to the main distillation. Distillation was again stopped at a pot temperature of 50° C. at 5 mm. Hg. Similarly the second and third oil phase washes were added and distilled off.

The final residue of crude dibasic acids remaining in the pot and weighing 485 grams was transferred to a beaker and intimately contacted with two-thirds of its weight of isopropyl ether. The resulting slurry was filtered and the precipitate returned to the beaker and rewashed with the same quantity of isopropyl ether and again filtered. This procedure was repeated once more. After the final filtration, the precipitate was spread on paper and the residual isopropyl ether permitted to evaporate to the air. There were thus obtained 109 grams of dibasic acids.

20 grams of the dibasic acids so produced, which were green in color and contained metal compounds as inorganic impurities, and analyzed 0.48 percent ash, were stirred for 5 minutes with 200 milliliters of acetone having a temperature of about 125° F. All but a small amount of green material was dissolved. The resulting mixture was filtered hot through a medium porosity fritted glass suction funnel. The filter cake obtained was dried to 0.36 gram (1.8 percent by weight of the dibasic acids treated) of a green powder analyzing 24.03 percent ash containing 8.36 percent iron and aluminum as a second major constituent. The colorless filtrate was evaporated giving 19.6 grams (98 percent) of hard white dibasic acids with ash analysis less than 0.01 percent.

We have found that acetone is unique in the purification of this invention. In addition to acetone we have employed methanol, ethanol, methylethylketone, acetic acid, nitropropane, diethylether, chloroform, and isoproply ether to purify dibasic acid mixtures containing the inorganic materials referred to earlier. In no case were we able to effect a purification of the impure dibasic acids comparable to the purification obtained with acetone. This is shown below in the case of ethyl alcohol, isopropyl ether and nitropropane.

*Example II*

20 grams of dibasic acids prepared as in Example I were warmed with 100 grams of ethyl alcohol, dissolving all but a small amount of insoluble material. Filtration of the mixture gave a green solution indicating that the colored inorganic impurities were not removed completely. Furthermore, on evaporation of the ethyl alcohol from the filtrate a partially liquid product resulted indicating that esterification of the acids with the alcohol had occurred.

*Example III*

20 grams of dibasic acids prepared as in Example I were extracted in a Soxhlet extractor with 200 ml. of isopropyl ether for eight hours with the extraction thimble draining every eight minutes. At the end of this time 8.35 percent of the acids remained undissolved in the thimble due to their extremely low solubility in the ether. The ether solution draining from the thimble also had a pale green color.

*Example IV*

20 grams of dibasic acids prepared as in Example I were warmed with 200 grams of nitropropane with nearly complete solution. The filtered solution again had a green color.

Obviously, many modifications and variations of the invention, as hereinabove set forth, can be made without departing from the spirit and scope thereof, and therefore only such limitations should be imposed as are indicated in the appended claims.

We claim:

1. A method for obtaining dibasic acids free of metal impurities which comprises oxidizing a hydrocarbon with nitric acid in a metal container wherein said metal is selected from at least one of the group consisting of iron, chromium, nickel, aluminum and molybdenum to obtain a product containing dibasic acids having from 3 to 12 carbon atoms, unreacted nitric acid and an impurity comprised of at least one of said metals, distilling said product to remove all of said unreacted nitric acid therefrom, dissolving the remainder of said product containing said dibasic acids and said metal impurity in acetone under pressure and temperature conditions such as to maintain the acetone in liquid phase, filtering said solution, thereby separating said metal impurity from said solution, and thereafter recovering a filtrate containing the purified dibasic acids.

2. A method for obtaining dibasic acids free of metal impurities which comprises oxidizing a hydrocarbon with nitric acid in a metal container wherein said metal is selected from at least one of the group consisting of iron, chromium, nickel, aluminum and molybdenum to obtain a product containing dibasic acids having from 3 to 12 carbon atoms, unreacted nitric acid and an impurity comprised of at least one of said metals, distilling said product to remove all of said unreacted nitric acid therefrom, dissolving the remainder of said product containing said dibasic acids and said metal impurity in acetone having a temperature of about 90° to about 133° F., filtering said solution, thereby separating said metal impurity from said solution, and thereafter recovering a filtrate containing the purified dibasic acids.

3. A method for obtaining dibasic acids free of metal impurities which comprises oxidizing a hydrocarbon with nitric acid in a metal container wherein said metal is selected from at least one of the group consisting of iron, chromium, nickel, aluminum and molybdenum to obtain a product containing dibasic acids having from 3 to 12 carbon atoms, unreacted nitric acid and an impurity comprised of at least one of said metals, distilling said product to remove all of said unreacted nitric acid therefrom, dissolving the remainder of said product containing said dibasic acids and said metal impurity in about one to about 15 parts by weight of acetone under pressure and temperature conditions such as to maintain the acetone in liquid phase, filtering said solution, thereby separating said metal impurity from said solution, and thereafter recovering a filtrate containing the purified dibasic acids.

4. A method for obtaining dibasic acids free of metal impurities which comprises oxidizing a hydrocarbon with nitric acid in a metal container wherein said metal is selected from at least one of the group consisting of iron, chromium, nickel, aluminum and molybdenum to obtain a product containing dibasic acids having from 3 to 12 carbon atoms, unreacted nitric acid and an impurity comprised of at least one of said metals, distilling said product to remove all of said unreacted nitric acid therefrom, washing the remainder of said product containing said dibasic acids and said metal impurity with isopropyl ether, dissolving the remainder of said washed product in acetone under pressure and temperature conditions such as to maintain the acetone in liquid phase, filtering said solution, thereby separating said metal impurity from said solution, and thereafter recovering a filtrate containing the purified dibasic acids.

(References on following page)

References Cited in the file of this patent

UNITED STATES PATENTS

| | | |
|---|---|---|
| 2,329,433 | Bruson | Sept. 14, 1943 |
| 2,470,849 | Hanson | May 24, 1949 |
| 2,698,336 | Nelson | Dec. 28, 1954 |
| 2,771,482 | Brown et al. | Nov. 20, 1956 |
| 2,815,358 | Crowley et al. | Dec. 3, 1957 |
| 2,824,122 | Kuceski | Feb. 18, 1958 |
| 2,824,134 | Hill et al. | Feb. 18, 1958 |
| 2,840,607 | Attane et al. | June 24, 1958 |

FOREIGN PATENTS

| | | |
|---|---|---|
| 540,004 | Great Britain | Oct. 1, 1941 |